US011783694B2

(12) United States Patent
Shannon et al.

(10) Patent No.: US 11,783,694 B2
(45) Date of Patent: Oct. 10, 2023

(54) DETERMINING RESPONDER CLOSEST TO DOWNED RESPONDER

(71) Applicant: 3M INNOVATIVE PROPERTIES COMPANY, St. Paul, MN (US)

(72) Inventors: Matthew Shannon, Salisbury, NC (US); Craig M. Parkulo, Midland, NC (US); Wesley M. Barbee, Oxboro, NC (US); Ronnie G. Durham, Monroe, NC (US); Dean L. Gervasi, Madison, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/633,097

(22) PCT Filed: Aug. 4, 2020

(86) PCT No.: PCT/IB2020/057371
§ 371 (c)(1),
(2) Date: Feb. 4, 2022

(87) PCT Pub. No.: WO2021/024185
PCT Pub. Date: Feb. 11, 2021

(65) Prior Publication Data
US 2022/0335809 A1 Oct. 20, 2022

Related U.S. Application Data

(60) Provisional application No. 62/884,379, filed on Aug. 8, 2019.

(51) Int. Cl.
*G08B 1/08* (2006.01)
*G08B 25/01* (2006.01)
(Continued)

(52) U.S. Cl.
CPC ......... *G08B 25/016* (2013.01); *G06Q 50/265* (2013.01); *G08B 25/10* (2013.01); *H04W 4/029* (2018.02); *H04W 4/90* (2018.02)

(58) Field of Classification Search
CPC ............... G08B 25/016; G08B 25/10; G08B 21/0266; G08B 25/14; G06Q 50/265; H04W 4/029; H04W 4/90; H04W 24/08
(Continued)

(56) References Cited

U.S. PATENT DOCUMENTS 6,054,929 A * 4/2000 Garofalo ................. B63C 11/02
340/676
6,686,839 B2 2/2004 Chou
6,826,117 B2 11/2004 Haase
6,965,344 B1 11/2005 Halsey
(Continued)

FOREIGN PATENT DOCUMENTS

| CN | 202475761 | 10/2012 |
|---|---|---|
| KR | 10-2011-0053827 | 5/2011 |
| KR | 10-1279886 | 6/2013 |

OTHER PUBLICATIONS

International Search Report for PCT International Application No. PCT/IB2020/057371, dated Nov. 5, 2020, 3 pages.

*Primary Examiner* — Tai T Nguyen
(74) *Attorney, Agent, or Firm* — Johannes P. M. Kusters; David B. Patchett

(57) ABSTRACT

A monitoring unit for wireless communication with a plurality of self-contained breathing apparatus (SCBA) units configured to form a network is provided. The monitoring unit includes a communication interface and processing circuitry. The processing circuitry is configured to receive, via the communication interface, a plurality of updates from each of the SCBA units where each update includes information indicating at least one communication link quality to
(Continued)

at least one other SCBA unit. The processing circuitry is further configured to determine at least one distance from each SCBA unit to at least one other SCBA unit that is one hop away in the network based at least in part on the communication link quality. The processing circuitry is further configured to cause the determined at least one distance to be displayed.

10 Claims, 7 Drawing Sheets

(51) Int. Cl.
  *H04W 4/029* (2018.01)
  *H04W 4/90* (2018.01)
  *G06Q 50/26* (2012.01)
  *G08B 25/10* (2006.01)

(58) Field of Classification Search
  USPC .................................................. 340/539.1
  See application file for complete search history.

(56) References Cited

U.S. PATENT DOCUMENTS

| | | |
|---|---|---|
| 6,978,159 B2 | 12/2005 | Feng |
| 7,398,097 B2 | 7/2008 | Parkulo |
| 7,639,147 B2 | 12/2009 | Berezowski |
| 8,872,655 B2 * | 10/2014 | Buller ................. G08B 21/0227 340/539.32 |
| 9,024,748 B2 | 5/2015 | Haase |
| 10,129,704 B1 | 11/2018 | Huseth et al. |
| 10,358,199 B1 * | 7/2019 | Kleinigger .............. B63C 11/26 |
| 2001/0030603 A1 * | 10/2001 | Arens ................. G08B 13/1427 340/506 |
| 2002/0008625 A1 | 1/2002 | Adams et al. |
| 2002/0176323 A1 * | 11/2002 | Magine ................... B63C 11/26 367/134 |
| 2008/0068267 A1 | 3/2008 | Huseth |
| 2009/0315687 A1 | 12/2009 | Kanevsky |
| 2014/0030982 A1 * | 1/2014 | Cardona ................... G01S 5/14 455/67.11 |
| 2017/0132884 A1 | 5/2017 | Kumar |
| 2017/0303187 A1 * | 10/2017 | Crouthamel ...... H04W 52/0235 |
| 2019/0191278 A1 | 6/2019 | Singh |
| 2019/0206233 A1 | 7/2019 | Huseth |

* cited by examiner

| SCBA unit 12a | | | | | | |
|---|---|---|---|---|---|---|
| | SCBA unit 12d | SCBA unit 12e | SCBA unit 12f | SCBA unit 12k | SCBA unit 12b | SCBA unit 12g |
| | LQI For link a-d | LQI For link a-e | LQI For link a-f | LQI For link a-k | LQI For link a-b | LQI For link a-g |

FIG. 5

| | | | | | | |
|---|---|---|---|---|---|---|
| SCBA unit 12a | SCBA unit 12d | SCBA unit 12e | SCBA unit 12f | SCBA unit 12k | SCBA unit 12b | SCBA unit 12g |
| | LQI | LQI | LQI | LQI | LQI | LQI |
| SCBA unit 12b | SCBA unit 12g | SCBA unit 12a | SCBA unit 12k | | | |
| | LQI | LQI | LQI | | | |
| SCBA unit 12c | SCBA unit 12h | SCBA unit 12j | SCBA unit 12i | | | |
| | LQI | LQI | LQI | | | |
| SCBA unit 12d | SCBA unit 12e | SCBA unit 12a | SCBA unit 12g | | | |
| | LQI | LQI | LQI | | | |
| SCBA unit 12e | GW | SCBA unit 12a | SCBA unit 12d | | | |
| | LQI | LQI | LQI | | | |
| SCBA unit 12f | GW | SCBA unit 12i | SCBA unit 12k | SCBA unit 12a | | |
| | LQI | LQI | LQI | LQI | | |
| SCBA unit 12g | SCBA unit 12d | SCBA unit 12a | SCBA unit 12b | | | |
| | LQI | LQI | LQI | | | |
| SCBA unit 12h | GW | SCBA unit 12c | SCBA unit 12i | | | |
| | LQI | LQI | LQI | | | |
| SCBA unit 12i | GW | SCBA unit 12j | SCBA unit 12c | SCBA unit 12j | SCBA unit 12f | |
| | LQI | LQI | LQI | LQI | LQI | |
| SCBA unit 12j | SCBA9 | SCBA unit 12c | | | | |
| | LQI | LQI | | | | |
| SCBA unit 12k | SCBA unit 12a | SCBA unit 12f | SCBA unit 12b | | | |
| | LQI | LQI | LQI | | | |

FIG. 6

DETERMINING RESPONDER CLOSEST TO DOWNED RESPONDER

CROSS REFERENCE TO RELATED APPLICATIONS

This application is a national stage filing under 35 U.S.C. 371 of PCT/IB2020/057371, filed Aug. 4, 2020, which claims the benefit of U.S. Provisional Patent Application No. 62/884,379, filed Aug. 8, 2019, the disclosure of which is incorporated by reference in its/their entirety herein.

FIELD

The present technology is generally related to location determination, and in particular to tracking the location of self-contained breathing apparatus (SCBA) units used by first responders relative to each other.

BACKGROUND

During an emergency ground operation such as a fire ground operation, the person in charge of the scene (i.e., incident commander (IC)) attempts to locate themselves in an exterior position that affords them the best overall view of the fire scene. However, the incident commander usually can only see two sides of a structure and usually cannot see inside the structure, thereby possibly hindering oversight.

In the event a firefighter finds themself in trouble during the incident and a Personal Alert Safety System (PASS) alarm is triggered, the incident commander rarely has a direct line of sight to the event. The incident commander typically relies on radio communication with units inside the structure and possibly with the unit in distress to get an idea of the situation. The incident commander then makes an assessment based on this information and formulates a plan to rescue the distressed unit. However, the incident commander's plan is based on limited information, which may delay rescue operations of the distressed unit.

SUMMARY

The techniques of this disclosure generally relate to tracking and locating one or more self-contained breathing apparatus (SCBA) units. In particular, the disclosure provides a method of alerting an incident commander of an emergency scene, such as a fire, natural disaster or terrorist attack, to one or more first responders or emergency responders in distress that are proximate to one or more other emergency responders. In one or more embodiments, multiple radio frequency (RF) personal alert safety system (PASS) consisting of multiple portable RF-PASS units worn by emergency responders (e.g., firefighters) engaged in emergency scene activities are provided. The RF-PASS units may be in communication with a base station monitored by the incident commander in charge of the emergency scene. The base station and RF-PASS units may be connected in a network. In one or more embodiments, the portable RF-PASS units collect and transmit neighbor table information back to the base station. Within the neighbor table information is one or more link quality indications of the RF-PASS unit with respect to one or more (neighboring) RF-PASS units in the network. The link quality indications may provide an approximate estimation of distance. In one or more embodiments, this information (e.g., neighboring tables) is processed and displayed by the base station, thereby providing the incident commander with a relative position of emergency responders with respect to each other. In the event an emergency responder gets into trouble (e.g., PASS alert is generated), the incident commander, in one or more embodiments, may assign one or more emergency responders closest to the emergency responder in distress to assist, thereby speeding up the rescue of the emergency responder in distress.

In one or more embodiments, the teaching of the invention can be implemented in a Scott Electronic Management System (SEMS) system that has had its software modified to perform one or more functions described herein.

According to one or more embodiments of this aspect, a monitoring unit for wireless communication with a plurality of self-contained breathing apparatus (SCBA) units forming a network is provided. The monitoring unit includes a communication interface and processing circuitry. The processing circuitry is configured to receive, via the communication interface, a plurality of updates from each of the SCBA units where each update includes information indicating at least one communication link quality to at least one other SCBA unit. The processing circuitry is further configured to determine at least one distance from each SCBA unit to at least one other SCBA unit that is one hop away in the network based at least in part on the communication link quality. The processing circuitry is further configured to cause the determined at least one distance to be displayed.

According to one or more embodiments of this aspect, the processing circuitry is further configured to determine a positioning of the plurality of SCBA units relative to each other based at least in part on the communication link quality, and cause display of the positioning of the plurality of SCBA units relative to each other such as on an electronic display. According to one or more embodiments of this aspect, each update of the plurality of updates includes a neighbor table, the neighbor table indicating the at least one communication link quality.

According to one or more embodiments of this aspect, the neighbor table includes information associated with the SCBA unit, the information including a fluid level of a fluid reservoir of the SCBA unit. According to one or more embodiments of this aspect, the processing circuitry is further configured to determine that a SCBA unit has triggered an alarm, determine at least one other SCBA unit within a predefined distance from the SCBA unit that triggered the alarm, and cause the at least one other SCBA unit that is within the predefined distance to be displayed. According to one or more embodiments, the neighbor table indicates a plurality of communication link qualities associated with the plurality of SCBA units.

According to another aspect of the invention, a method performed by a monitoring unit in wireless communication with a plurality of self-contained breathing apparatus (SCBA) units forming a network is provided. A plurality of updates from each of the SCBA units is received. Each update includes information indicating at least one communication link quality to at least one other SCBA unit. At least one distance from each SCBA unit to at least one other SCBA unit that is one hop away in the network is determined based at least in part on the communication link quality. The determined at least one distance is caused to be displayed.

According to one or more embodiments of this aspect, a positioning of the plurality of SCBA units relative to each other is determined based at least in part on the communication link quality. The positioning of the plurality of SCBA units relative to each other is caused to be displayed. According to one or more embodiments of this aspect, each update of the plurality of updates includes a neighbor table, the neighbor table indicating the at least one communication link quality. According to one or more embodiments of this aspect, the neighbor table indicates a plurality of communication link qualities associated with the plurality of SCBA units. According to one or more embodiments of this aspect, the neighbor table includes information associated with the SCBA unit, the information including a fluid level of a fluid reservoir of the SCBA unit. According to one or more embodiments of this aspect, a determination is made that a SCBA unit has triggered an alarm. At least one other SCBA unit within a predefined distance from the SCBA unit that triggered the alarm is determined. The at least one other SCBA unit that is within the predefined distance is caused to be displayed.

According to another aspect of the invention, a self-contained breathing apparatus (SCBA) unit configured to form part of a network is provided. The SCBA unit is configured to communicate with at least one of a plurality of other SCBA units forming part of the network. The SCBA unit includes a communication interface and processing circuitry. The processing circuitry is configured to determine at least one communication link quality corresponding to a communication link to at least one other SCBA unit that is one logical hop away in the network and provide an update to a monitoring unit where the update indicates the at least one communication link quality. The update includes an indication of an alarm if the alarm has been triggered.

According to one or more embodiments of this aspect, the update includes a neighbor table, the neighbor table indicating a plurality of communication link qualities, each communication link quality corresponding to a respective communication link quality between the SCBA unit and another respective SCBA unit that is within one logical hop in the network of the SCBA unit. According to one or more embodiments of this aspect, the processing circuitry is further configured to receive, from a sensor, information including a fluid level of a fluid tank of the SCBA unit, the update including at least a portion of the information received from the SCBA unit. According to one or more embodiments of this aspect, the processing circuitry is further configured to generate a data log file associated with the triggered alarm, the update including the data log file associated with the triggered alarm.

According to another aspect of the disclosure, a method performed by a self-contained breathing apparatus (SCBA) unit configured to form part of a network is provided. The SCBA unit is in communication with at least one of a plurality of other SCBA units configured to form part of the network. At least one communication link quality to at least one other SCBA unit that is one logical hop away in the network is determined. An update to a monitoring unit is provided where the update indicates the at least one communication link quality. The update includes an indication of the alarm if an alarm has been triggered.

According to another aspect of the disclosure, the update includes a neighbor table where the neighbor table indicates a plurality of communication link qualities. Each communication link quality corresponds to a respective communication link quality between the SCBA unit and another respective SCBA unit that is within one logical hop in the network of the SCBA unit. According to another aspect of the disclosure, information including a fluid level of a fluid tank of the SCBA unit is received. The update includes at least a portion of the information received from the SCBA unit. According to another aspect of the disclosure, a data log file associated with the triggered alarm is generated where the update includes the data log file associated with the triggered alarm.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 5 is a diagram of a neighbor table in accordance with the principles of the invention;

FIG. 6 is a diagram of a system table in accordance with the principles of the invention.

DETAILED DESCRIPTION

Figure 1:
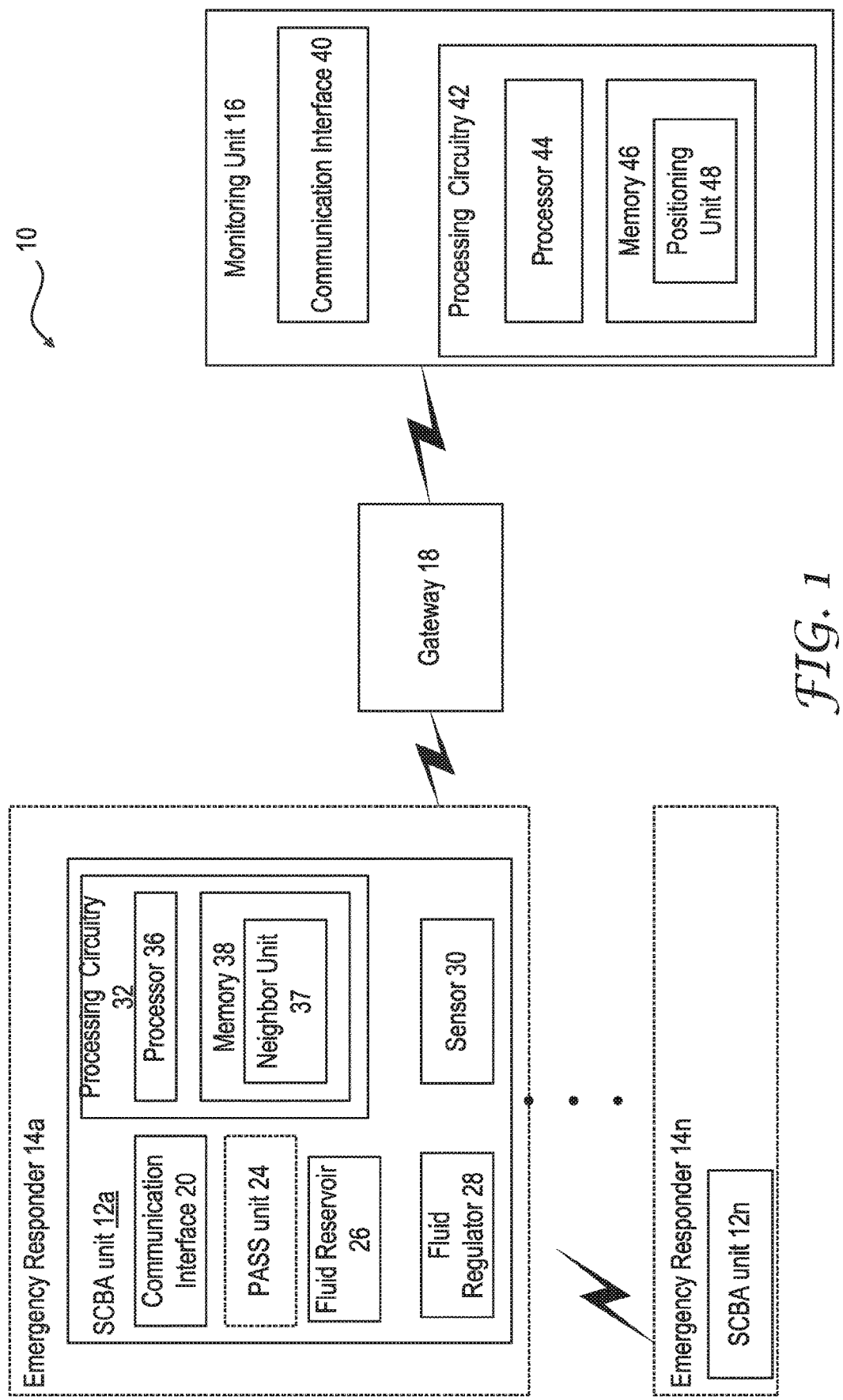
FIG. 1 is a block diagram of a system in accordance with the principles of the invention.

Before describing in detail example embodiments that are in accordance with the invention, it is noted that the embodiments reside primarily in combinations of controller components and processing steps related to SCBA unit tracking and positioning. Accordingly, components have been represented where appropriate by conventional symbols in drawings, showing only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication. For simplicity and ease of explanation, the invention will be described herein in connection with various embodiments thereof. Those skilled in the art will recognize, however, that the features and advantages of the invention may be implemented in a variety of configurations. It is to be understood, therefore, that the embodiments described herein are presented by way of illustration, not of limitation.

Figure 4:
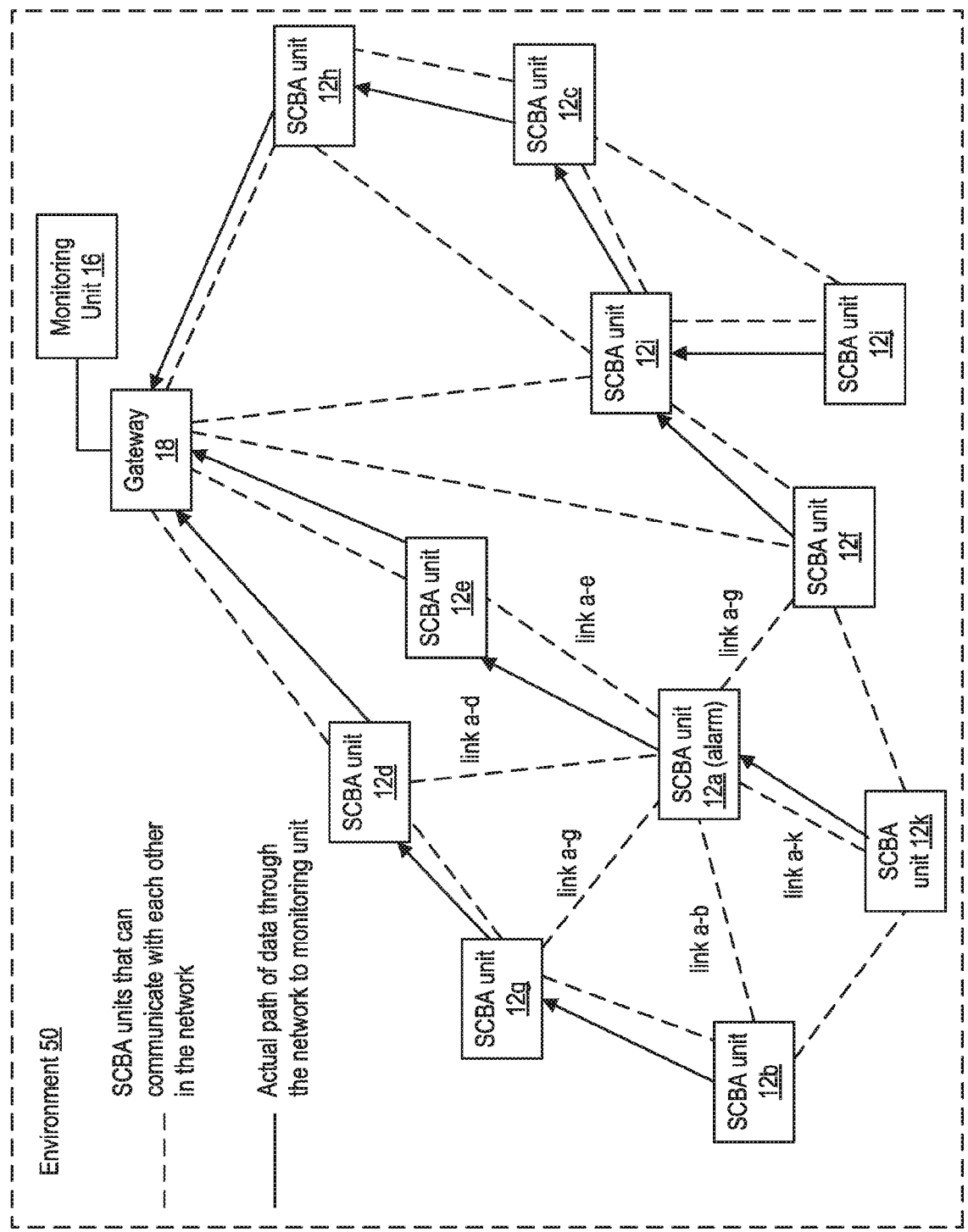
FIG. 4 is a block diagram of one example implementation of a system in accordance with the principles of the invention.

Referring now to drawing figures in which like reference designators refer to like elements, there is shown in FIG. 1 an example system for providing determining information in accordance with the principles of the invention and designated generally as "10." System 10 includes self-contained breathing apparatuses (SCBA) units 12*a*-12*n* (collectively referred to as SCBA unit 12) that may be configured to form a network as illustrated in FIG. 4, where one or more SCBA units are in wireless communication with one or more other SCBA units using known wireless communication protocols. Each SCBA unit 12 is associated with a respective one of emergency responder 14*a*-*n*. For example, SCBA unit 12*a* may be mounted and/or removably affixed to emergency responder 14*a*.

The SCBA units 12 may be in wireless communication with monitoring unit 16 via the network and via gateway 18. Gateway 18 may be a wireless gateway that communicates wireless packets between the network of SCBA units 12 and monitoring unit 16. The general functions of a wireless gateway are known in the art. In one or more embodiments, the network is a mesh network. As used herein, the terms "mesh" and "mesh network" are not intended to mean that every SCBA unit 12 in the network can directly communicate with every other SCBA unit 12 in the network. Rather, it is understood that mesh as used herein means that a SCBA unit 12 can communicate directly or indirectly with the other SCBA units 12 and/or directly or indirectly with the monitoring unit 16 via gateway 18. In other words, the group of SCBA units 12 can form a physically partial mesh network that still allows any to any communication.

SCBA unit 12 includes a one or more communication interfaces 20 that are configured to communicate with one or more other SCBA units 12, gateway 18 and monitoring unit 16. For example, in one or more embodiments, the communication interface 20 may be a radio interface that is configured to communicate with other SCBA units 12 and gateway 18. Communication interface 20 may include one or more of a transmitter and receiver. SCBA unit 12 may include one or more personal alert safety system (PASS) units 24 for triggering an alarm based on one or more criteria. For example, the PASS unit 24 may monitor one or more of the environment, emergency responder 14 vital signs, among other data to determine whether to trigger an alarm that indicates the emergency responder 14 may be in distress.

SCBA unit 12 includes fluid reservoir 26 for storing fluid and providing fluid to the emergency responder 14. SCBA unit 12 includes a fluid regulator 28 for regulating fluid flow from the fluid reservoir 26 to the emergency responder 14. Fluid as used herein can refer to breathable air or a mixture of breathable air with other gases and/or fluids. SCBA unit 12 includes one or more sensors 30 that are configured to perform measurements of one or more of the environment, emergency responder 14 and/or other types of measurements that may be used to determine that the emergency responder 14 is in distress. SCBA unit 12 includes processing circuitry 32. In some embodiments, processing circuitry 32 may include a processor 36 and memory 38, memory 38 containing instructions which, when executed by processor 36, configure processor 36 to perform the one or more functions described herein such as the process described with respect to FIG. 3. In addition to a traditional processor and memory, control processing circuitry 32 may include integrated circuitry for processing and/or control, e.g., one or more processors and/or processor cores and/or FPGAs (Field Programmable Gate Array) and/or ASICs (Application Specific Integrated Circuitry).

Processing circuitry 32 may comprise and/or be connected to and/or be configured for accessing (e.g., writing to and/or reading from) memory 38, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 38 may be configured to store code executable by circuitry and/or other data, e.g., weather data, settings data, etc. Processing circuitry 32 may be configured to control any of the methods described herein and/or to cause such methods to be performed, e.g., by processor 36.

Corresponding instructions may be stored in memory 38, which may be readable and/or readably connected to the processing circuitry 32. In other words, processing circuitry 32 may include a controller, which may comprise a microprocessor and/or microcontroller and/or FPGA (Field-Programmable Gate Array) device and/or ASIC (Application Specific Integrated Circuit) device. It may be considered that processing circuitry 32 includes or may be connected or connectable to memory, which may be configured to be accessible for reading and/or writing by the controller and/or processing circuitry 32. Memory 38 is configured to store neighbor unit 37 for performing one or more processes described herein such as the process described in detail with respect to FIG. 3. SCBA unit 12 includes various hardware and software (e.g., programing stack) for performing measurements, tracking fluid levels, performing sensor measurements via one or more sensors 30, communicating measurements and/or other SCBA units 12 etc., for performing other functions and/or processes.

Monitoring unit 16 includes communication interface 40 that is configured to communicate with SCBA units 12 via gateway 18. Communication interface 40 may include, for example, a radio interface for providing wireless communication described herein. In one or more embodiments, gateway 18 functions may be performed by monitoring unit 16 such that one or more SCBA units 12 communicate directly with monitoring unit 16.

Monitoring unit 16 includes processing circuitry 42. In some embodiments, processing circuitry 42 may include a processor 44 and memory 46, memory 46 containing instructions which, when executed by processor 44, configure processor 44 to perform the one or more functions described herein such as the process described with respect to FIG. 2. In addition to a traditional processor and memory, control processing circuitry 42 may include integrated circuitry for processing and/or control, e.g., one or more processors and/or processor cores and/or FPGAs (Field Programmable Gate Array) and/or ASICs (Application Specific Integrated Circuitry).

Processing circuitry 42 may comprise and/or be connected to and/or be configured for accessing (e.g., writing to and/or reading from) memory 46, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 46 may be configured to store code executable by circuitry and/or other data, e.g., weather data, settings data, SCBA event data, etc. Processing circuitry 42 may be configured to control any of the methods described herein and/or to cause such methods to be performed, e.g., by processor 44.

Corresponding instructions may be stored in memory 46, which may be readable and/or readably connected to the processing circuitry 42. In other words, processing circuitry 42 may include a controller, which may comprise a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 42. Memory 46 is configured to store positioning unit 48 for performing one or more processes described herein such as the process described in detail with respect to FIG. 2.

Figure 2:
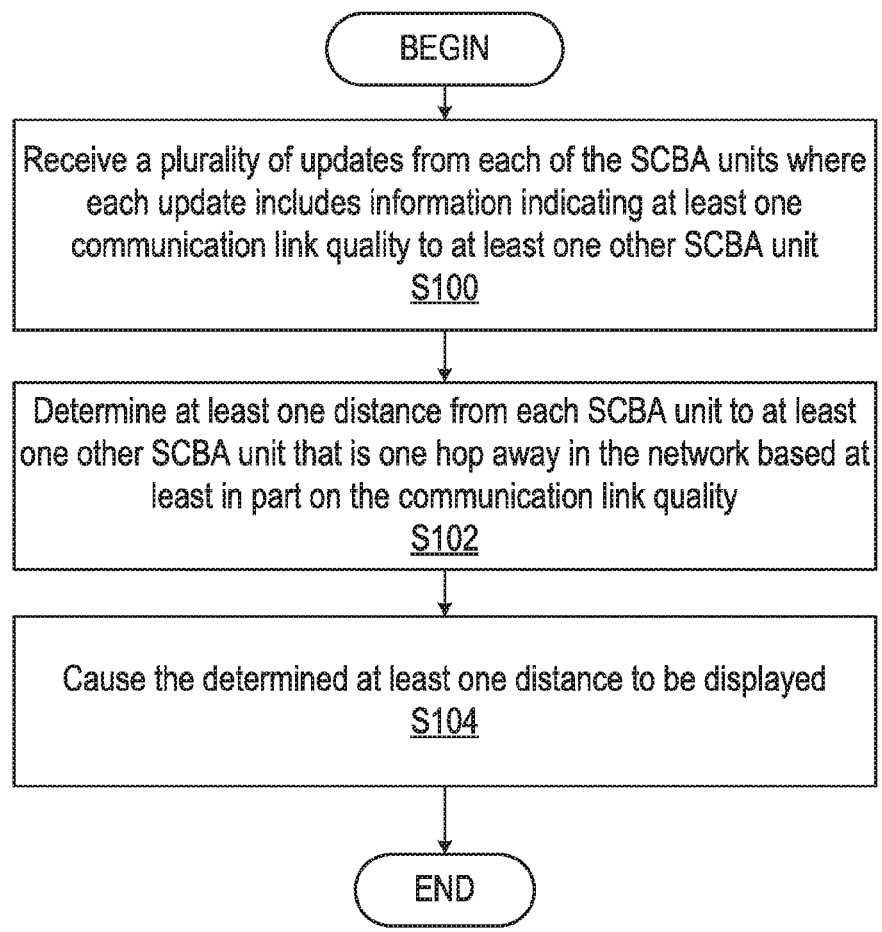
FIG. 2 is a flow diagram of a process performed by a monitoring unit in accordance with the principles of the invention.

FIG. 2 is a flow chart of an exemplary process performed by a monitoring unit 16 in accordance with the principles of the invention. One or more Blocks and/or functions performed by monitoring unit 16 may be performed by one or more elements of monitoring unit 16 such as by positioning unit 48 in processing circuitry 42, processor 44, communication interface 40, etc. In one or more embodiments, monitoring unit 16 such as via one or more of processing circuitry 42, processor 44 and communication interface 40 is configured to receive (Block S100), via the communication interface 40, a plurality of updates from each of the SCBA units 12 where each update includes information indicating at least one communication link quality to at least one other SCBA unit 12 and/or monitoring unit 16. In one or more embodiments, monitoring unit 16, such as via one or more of processing circuitry 42, processor 44 and communication interface 40, is configured to determine (Block S102) at least one distance from each SCBA unit 12 to at least one other SCBA unit 12 that is one hop away in the network based at least in part on the communication link quality. In one or more embodiments, communication link quality of a communication link in the network may correspond to, for example, one or more values of one or more of the following: received signal strength, signal to interference plus noise ratio, bit error rate, among other wireless communication signal metrics. In one or more embodiments, monitoring unit 16, such as via one or more of processing circuitry 42, processor 44 and communication interface 40, is configured to cause (Block S104) the determined at least one distance to be displayed such as via a display at monitoring unit 16.

According to one or more embodiments, the processing circuitry 42 is further configured to determine a positioning of the plurality of SCBA units 12 relative to each other based at least in part on the communication link quality, and cause display of the positioning of the plurality of SCBA units 12 relative to each other. According to one or more embodiments, each update of the plurality of updates includes a neighbor table where the neighbor table indicates the at least one communication link quality. According to one or more embodiments, the neighbor table includes an indication of whether an alarm has been triggered. According to one or more embodiments, the neighbor table indicates a plurality of communication link qualities associated with the plurality of SCBA units 12. According to one or more embodiments, the neighbor table includes information associated with the SCBA unit 12 where the information includes a fluid level of a fluid reservoir of the SCBA unit 12. According to one or more embodiments, the processing circuitry 42 is further configured to determine whether a SCBA unit 12 has triggered an alarm, determine at least one other SCBA unit within a predefined distance from the SCBA unit 12 that triggered the alarm, and cause the at least one other SCBA unit 12 that is within the predefined distance to be displayed.

Figure 3:
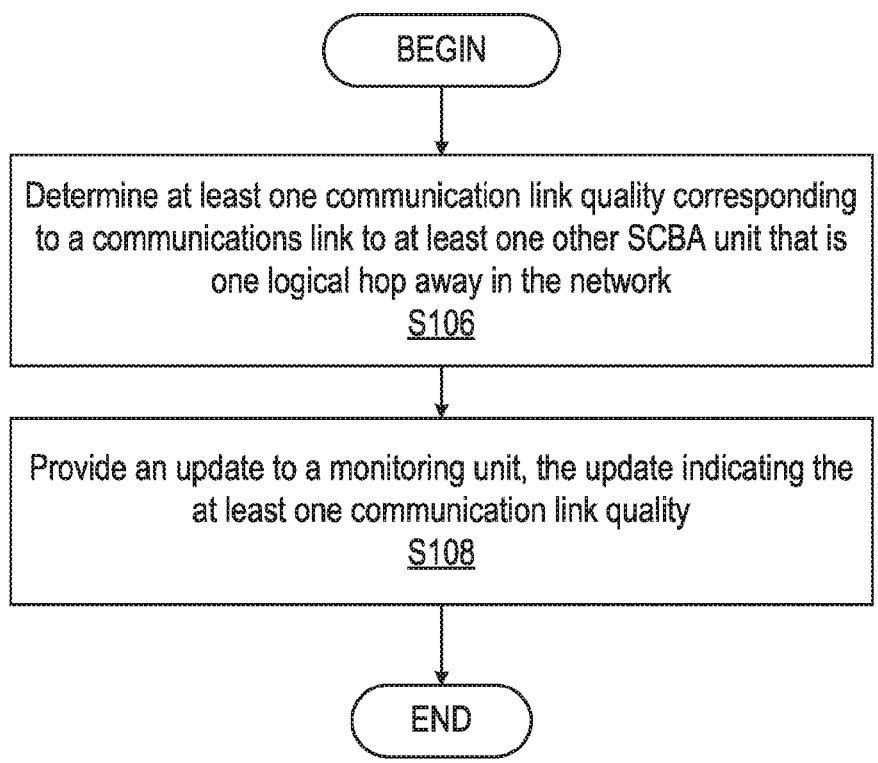
FIG. 3 is a flow diagram of a process performed by a SCBA unit in accordance with the principles of the invention.

FIG. 3 is a flow chart of an exemplary process performed by a SCBA unit 12 in accordance with the principles of the invention. One or more Blocks and/or functions performed by SCBA unit 12 may be performed by one or more elements of SCBA unit 12 such as by neighbor unit 37 in processing circuitry 32, processor 36, communication interface 20, etc. In one or more embodiments, SCBA unit 12 such as via one or more of processing circuitry 32, processor 36 and communication interface 20 is configured to determine (Block S106) at least one communication link quality corresponding to a communications link to at least one other SCBA unit 12 that is one logical hop away in the network. In one or more embodiments, SCBA unit 12 such as via one or more of processing circuitry 32, processor 36 and communication interface 20 is configured to provide (Block S108) an update to a monitoring unit where the update indicates the at least one communication link quality. According to one or more embodiments, if an alarm has been triggered, the update includes an indication of the alarm.

According to one or more embodiments, a positioning of the plurality of SCBA units 12 relative to each other based at least in part on the communication link quality is determined. The positioning of the plurality of SCBA units 12 relative to each other is caused to be displayed.

According to one or more embodiments, each update of the plurality of updates includes a neighbor table where the neighbor table indicates the at least one communication link quality, i.e., link quality indication. According to one or more embodiments, the neighbor table includes an indication whether an alarm has been triggered. According to one or more embodiments, the neighbor table includes information associated with the SCBA unit 12 where the information includes a fluid level of a fluid reservoir of the SCBA unit 12. According to one or more embodiments, a determination is made that a SCBA unit 12 has triggered an alarm. At least one other SCBA unit 12 within a predefined distance from the SCBA unit 12 that triggered the alarm is determined. The at least one other SCBA unit 12 that is within the predefined distance is caused to be displayed, FIG. 4 is an example system 10 within environment 50 where each SCBA unit 12 is associated with a respective emergency responder 14. The dashed lines between SCBA units 12 indicate SCBA units that can communicate with each other in the network while the solid lines indicate the actual path of data through the network to the monitoring unit 16. In the example illustrated in FIG. 4, SCBA unit 12a has triggered an alarm indicating the emergency responder 14 associated with SCBA unit 12a is in distress. Using the example of FIG. 4, SCBA unit 12a transmits its neighbor table to monitoring unit 16 via SCBA unit 12e and gateway 18 where the neighbor table indicates an alarm has been triggered and also indicates SCBA unit 12a can communicate with SCBA units 12b, 12d, 12e, 12f, 12g and 12k. The monitoring unit 16 may use this neighbor table and other received neighbor tables from other SCBA units 12 to determine a position of SCBA unit 12a relative to one or more other SCBA units 12 as described herein.

FIG. 5 is a diagram of an example of a neighbor table stored by SCBA 12 in accordance with the principles of the invention. In the example of FIG. 5, the neighbor table that is stored and updated by SCBA unit 12a is shown where several link quality indications (LQI) for various links between SCBA unit 12a and other SCBA units 12 are shown. In one or more embodiments, LQI may be a value, alpha-numeric character, among other characters that can indicate a quality metric of the link. FIG. 6 is a diagram of an example of a system table stored by monitoring unit 16 in accordance with the principles of the invention. In one or more embodiments, monitoring unit 16 stores and updates the system table based at least in part on the neighbor tables received from various SCBA units 12. As illustrated in the example of FIG. 6, SCBA unit 12d can communicate with SCBA units 12e, 12a and 12g, but not other SCBA units 12 due to, for example, the current position of the other SCBA units 12.

Figure 7:
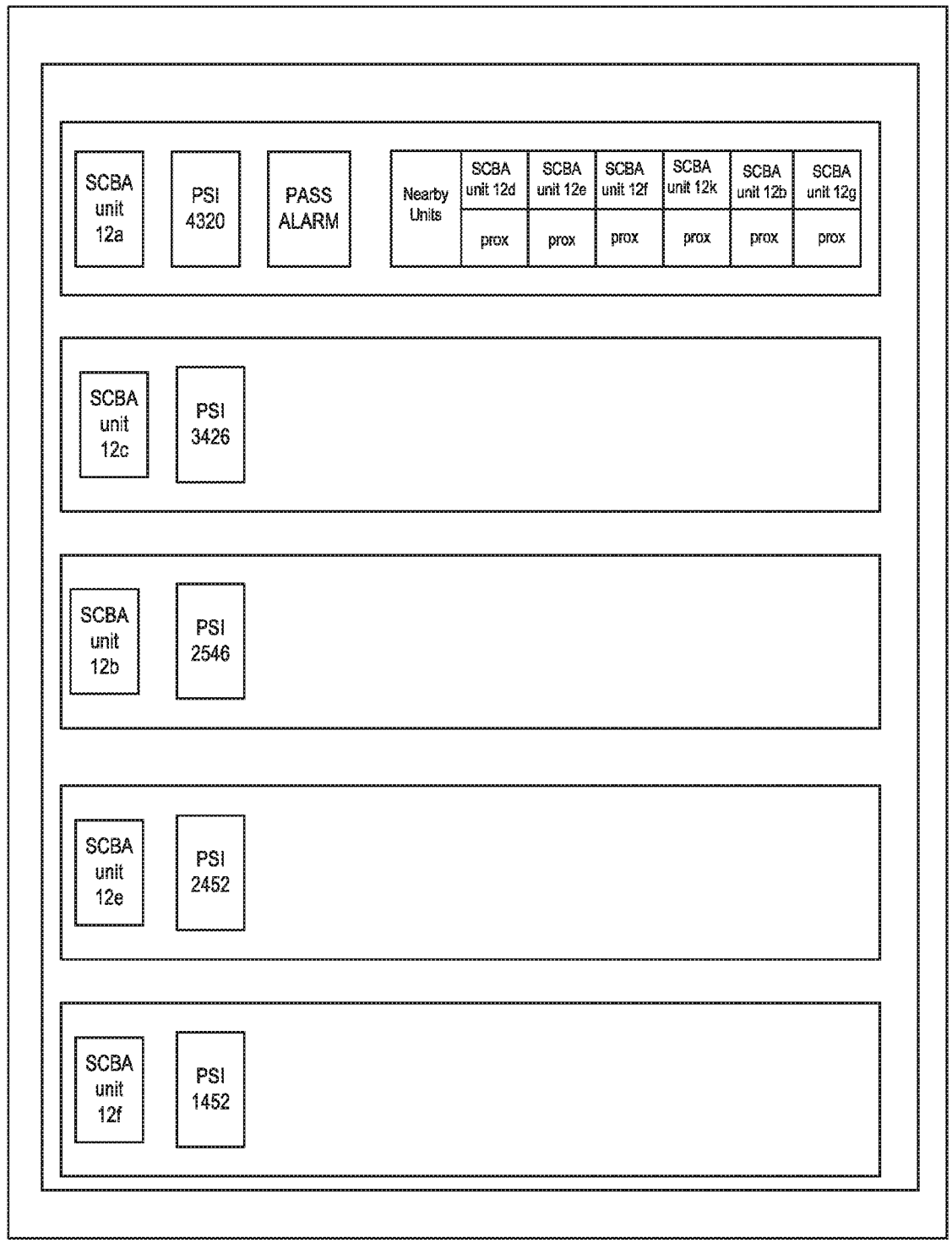
FIG. 7 is a diagram of a system interface in accordance with the principles of the invention.

FIG. 7 is a diagram of an example system interface in accordance with the principles of the invention. For example, based at least in part on the neighbor tables and SCBA data received from each SCBA unit 12, monitoring unit 16 is configured to generate and display an interface illustrating one or more characteristics of one or more SCBA units 12. For example, SCBA unit 12a reports to monitoring unit 16 that the PSI measurement of the fluid reservoir 26 is 4320 PSI. SCBA unit 12a also communicates its neighbor table the indicated alarm, i.e., PASS alarm, has been triggered. The LQI values meeting a predefined threshold may indicate that one SCBA unit 12 is proximate ("prox") another SCBA unit 12. For example, in one or more embodiments, at least one LQI value is used to determine distance and/or position as follows:

$$P_R = P_T 10*n*\log_n(f)10*n*\log_{10}(r)+30*n-32.44 \text{ (dBm)}$$

where $P_T$ is the transmitted power in dBm, $P_R$ is the received signal strength at a reference location, f is the transmitted signal frequency in MHz, n is the path-loss exponent, and r is a distance in meters. Other known methods and/or equations may be used to determine the distance and/or position based at least in part on at least one LQI value.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A monitoring unit for wireless communication with a plurality of self-contained breathing apparatus (SCBA) units configured to form a network, the monitoring unit comprising a communication interface and processing circuitry, the processing circuitry configured to:
   receive, via the communication interface, a plurality of updates from each of the SCBA units, each update including information indicating at least one communication link quality to at least one other SCBA unit;
   determine at least one distance from each SCBA unit to at least one other SCBA unit that is one hop away in the network based at least in part on the communication link quality;
   cause the determined at least one distance to be displayed;
   determine that a SCBA unit has triggered an alarm;
   determine at least one other SCBA unit within a predefined distance from the SCBA unit that triggered the alarm; and
   cause the at least one other SCBA unit that is within the predefined distance to be displayed.

2. The monitoring unit of claim 1, wherein the processing circuitry is further configured to:
   determine a positioning of the plurality of SCBA units relative to each other based at least in part on the communication link quality; and
   cause display of the positioning of the plurality of SCBA units relative to each other.

3. The monitoring unit of claim 1, wherein each update of the plurality of updates includes a neighbor table, the neighbor table indicating the at least one communication link quality.

4. The monitoring unit of claim 3, wherein the neighbor table indicates a plurality of communication link qualities associated with the plurality of SCBA units.

5. The monitoring unit of claim 4, wherein the neighbor table includes information associated with the SCBA unit, the information including a fluid level of a fluid reservoir of the SCBA unit.

6. A method performed by a monitoring unit in wireless communication with a plurality of self-contained breathing apparatus (SCBA) units configured to form a network, the method comprising:
- receiving a plurality of updates from each of the SCBA units, each update including information indicating at least one communication link quality to at least one other SCBA unit;
- determining at least one distance from each SCBA unit to at least one other SCBA unit that is one hop away in the network based at least in part on the communication link quality;
- causing the determined at least one distance to be displayed;
- determining a SCBA unit has triggered an alarm;
- determining at least one other SCBA unit within a predefined distance from the SCBA unit that triggered the alarm; and
- causing the at least one other SCBA unit that is within the predefined distance to be displayed.

7. The method of claim 6, further comprising:
- determining a positioning of the plurality of SCBA units relative to each other based at least in part on the communication link quality; and
- causing display of the positioning of the plurality of SCBA units relative to each other.

8. The method of claim 7, wherein each update of the plurality of updates includes a neighbor table, the neighbor table indicating the at least one communication link quality.

9. The method of claim 8, wherein the neighbor table indicates a plurality of communication link qualities associated with the plurality of SCBA units.

10. The method of claim 9, wherein the neighbor table includes information associated with the SCBA unit, the information including a fluid level of a fluid reservoir of the SCBA unit.

* * * * *